United States Patent [19]

Ehrenfreund

[11] 4,171,411

[45] Oct. 16, 1979

[54] INSULATIVE AND CUSHIONING INTERLINER FOR GARMENTS AND THE LIKE

[75] Inventor: Herbert A. Ehrenfreund, Madison, Conn.

[73] Assignee: Tuxis Corporation, Madison, Conn.

[21] Appl. No.: 917,847

[22] Filed: Jun. 22, 1978

Related U.S. Application Data

[63] Continuation-in-part of Ser. No. 764,225, Jan. 31, 1977, abandoned.

[51] Int. Cl.$^2$ ............................ C08J 9/12; C08L 53/02
[52] U.S. Cl. ...................................... 521/98; 521/139; 525/96; 525/99
[58] Field of Search .................... 260/897, 2.5 HA; 521/98, 139

[56] References Cited

U.S. PATENT DOCUMENTS

| B 373,354 | 1/1976 | Bocks et al. | 428/315 |
| 3,347,957 | 10/1967 | Adomaitis | 260/897 |
| 3,792,124 | 2/1974 | Davison et al. | 260/876 B |
| 3,810,964 | 5/1974 | Ehrenfreund | 260/2.5 HA |

*Primary Examiner*—Morton Foelak
*Attorney, Agent, or Firm*—Chapin, Neal & Dempsey

[57] ABSTRACT

A durable, light-weight interliner exhibiting enhanced insulative and cushioning properties is produced from a blend of approximately equal parts of a thermoplastic elastomer and an ionomer foamed by a normally gaseous expanding agent.

3 Claims, No Drawings

INSULATIVE AND CUSHIONING INTERLINER FOR GARMENTS AND THE LIKE

This Application is a continuation-in-part of copending Application Ser. No. 764,225, filed Jan. 31, 1977 and now abandoned.

BACKGROUND

This invention relates to interliners for garments and the like and particularly to a closed cell light-weight foam interliner of enhanced insulative and cushioning properties.

Sponge-like interliners for use as garment insulation in outerwear such as hats, coats, boots, as a shaping material in foundation garments and as cushioning for athletic headwear, padding and bandages and the like has been long known in the art. While such interliners all exhibit certain insulative and cushioning characteristics, each exhibit deficiencies in such areas as density, vapor transmission, abrasion resistance, thermoforming characteristics, ability to withstand washing and dry cleaning, resilience and durability.

Accordingly, it is an object of the present invention to provide an insulative and cushioning interliner for garments and the like, which interliner overcomes the deficiencies of the prior art.

It is another object of the present invention to provide such an interliner formed from a foam reinforced with a polymer for enhanced durability and resistance to abrasion.

It is another object of the present invention to provide such an interliner wherein the foam from which the interliner is formed is of a closed cell structure for low moisture vapor permeability.

It is another object of this invention to provide such a foamed interliner moldable by thermoforming techniques or foamable in a closed mold for forming a three dimensional shaped object that is easily sewn without tearing.

It is a further object of the present invention to provide such a foam interliner which may be formed in a variety of profiles for use in such diverse applications as insulated clothing liners, shaping and cushioning materials.

It is another object of the present invention to provide such a foam interliner which is of low density and thus economical to manufacture.

It is yet another object of the present invention to provide such a foam interliner which is soft and flexible while being resistant to washing and dry cleaning.

DESCRIPTION OF THE PREFERRED EMBODIMENT

In accordance with the present invention, the above listed objects are realized by the foaming of a mixture of a thermoplastic elastomer and an ionomer with a normally gaseous expanding agent in the presence of a nucleation system.

The ionomer employed in the present invention may be generally described as being derived from ethylene-/methacrylic acid copolymers which have been ionically cross-linked. An example of such materials is Suryln 1801 which is manufactured and sold by E. I. duPont de Nemours & Co., Inc.

The thermoplastic elastomer employed in the present invention may be generally described as conventional linear block copolymers having A-B-A type blocks. Typically, the thermoplastic segment is polystyrene, while the softer, elastomer segment is based on butadiene, isoprene, ethylene-propylene, ethylene-butylene or the like repeating units. An example of such materials is Kraton 2001 which is a styrene-butadiene block copolymer manufactured and sold by the Shell Chemical Company.

In producing the foam of the present invention, the ionomer and the thermoplastic elastomer are blended together in approximately equal parts by weight along with a nucleating agent so as to comprise about 40% to 100% by weight of a mixture for charging an extruder.

Other materials such as ethylene-vinyl-chloride, ethylene-ethyl acrylate, polyethylene, wax and similar blended polyolefins may also be added to the ionomer/TPE mixture in amounts of from about 0.1% to about 40% to alter the physical properties of the ultimate foam material.

Once a selected mixture has been charged to an extruder, and reached its melt temperature, a normally gaseous expanding agent is injected into the melt. An example of an acceptable expanding agent is Freon 114 which is dichlorotetrafluoroethane.

The following examples are given in illustration of the invention:

EXAMPLE I

An ionomer (Surlyn 1801) and a thermoplastic elastomer (Kraton 2001) were blended in equal parts by weight together with 0/1 parts by weight of a magnesium silicate nucleating agent (Mistron ZSC—United Sierra Co.) and fed to a small extruder at a rate of 14 pounds per hour. The extruder which was fitted with a 3/32 inch diameter die was maintained at the following temperatures:

Feed zone—285° F.
Melt and injection zone—290° F.
Metering zone—155° F.
Die zone—130° F.

Freon 114 was injected into the polymer melt at a rate of 3 pounds per hour. With the pressure of the polymer melt at the die being 1350 PSIG, a 0.75 inch diameter foam rod was extruded.

The foam product which had a density of about 3.0 pound per cubic foot and a fine cellular structure with a soft velvet-like feel. The product was determined to be useful for welting in shoes, upholstered furniture and clothing.

EXAMPLE II

In this Example the procedures of Example I were repeated using a 2 inch diameter die and a 6 inch diameter forming sizer downstream of the die. The product produced was an 18 inch wide and ⅛ inch thick foam sheet of the same structure and feel as that produced in Example I.

The product of this Example which was soft, pliable and accepted sewing stitches without tearing was thermoformed into a cup for a woman's bathing suit top.

EXAMPLE III

The procedures of Example I were repeated. In this Example, however, the blend formulation comprised about 80% by weight of equal parts of ionomer and TPE and about 20% by weight of an added copolymer of polyethylene consisting of 18% vinyl acetate.

The resultant foam product had a density of 1 pound per cubic foot and was exceptionally soft, pliable and tough, making it an excellent ear plug for noise attenuation.

EXAMPLE IV

The procedure of Example I was approximately duplicated, the foamed interliner material possessing the following physical properties:

| | |
|---|---|
| Density, pcf, ASTM D1564 | 4.0 |
| Cell Size | 0.19 mm |
| Resilience (Ball Rebound), % | |
| ASTM D1564 | 45.8 |
| Compression Deflection, R.T., psi., | |
| ASTM D1056 at 10% compression | 2.9 |
| at 25% compression | 5.6 |
| at 50% compression | 16.2 |
| Compression Set, R.T., 50% compression | |
| 22 hrs., 24 hr. recovery, ASTM D1056 | |
| % of original deflection | 51.1 |
| Tensile Strength, psi, 2 in. gage, | |
| 1.7"/min, ASTM D412 | 125.9 |
| Elongation, %, ASTM D412 | 75.5 |
| Tear Resistance, lb/in, ASTM D1564 | 23.2 |
| Water Absorbtion, % by volume, 3/16" sheet, 96 hrs. immersion, | |
| ASTM D2842 | 11.6 |

It will be appreciated from this data that the foam interliner of the present invention is of an enhanced resilience as compared to otherwise similar thermoplastic foams and in fact, is more comparable in resilience to polyurethane foam than thermoplastic foams. Moreover, the foamed interliner of this Example exhibits a finer cellular structure and more velvet-like hand than prior art thermoplastic foam.

EXAMPLE V

The procedure of Example I was repeated. However, the ionomer was omitted from the blend. The resultant product was not foamable, thus is not encompassed within the metes and bounds of the present invention.

EXAMPLE VI

The procedure of Example I was repeated. However, Freon 12 was substituted for Freon 114 as the expanding agent. The resultant product foamed, but the foam collapsed.

What is claimed is:

1. Insulative and cushioning interliner for garments and the like comprising a fine closed cell foam produced from a foamed blend of approximately equal parts by weight of an ethylene/methacrylic acid copolymer based ionomer resin and a styrene-butadiene block copolymer wherein said foamed blend is expanded by a normally gaseous expanding agent comprising dichlorotetrafluoroethane.

2. The interliner of claim 1 wherein said foamable blend includes from about 0.1% to about 40% by weight of a polyolefin.

3. An insulative and cushioning interliner for garments and the like comprising a fine, closed cell foam produced from a foamable blend of an ethylene/methacrylic acid copolymer based ionomer resin, a styrene-butadiene block copolymer, and a polyolefin, wherein said foamable blend is expanded by a normally gaseous expanding agent comprising dichlorotetrafluorine, said ionomer resin and block copolymer being present in said blend in approximately equal parts by weight and comprising from about 40% to 100% by weight of said blend, said polyolefin comprising from about 0% to about 40% by weight of said blend.

* * * * *